N. D. CLARK.
Garden-Sprinklers.
No. 148,596.   Patented March 17, 1874.
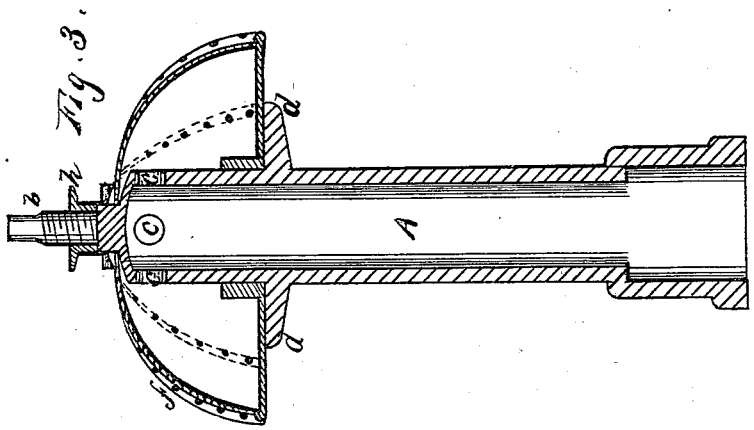
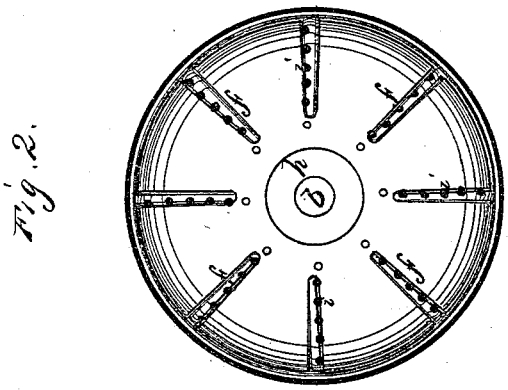
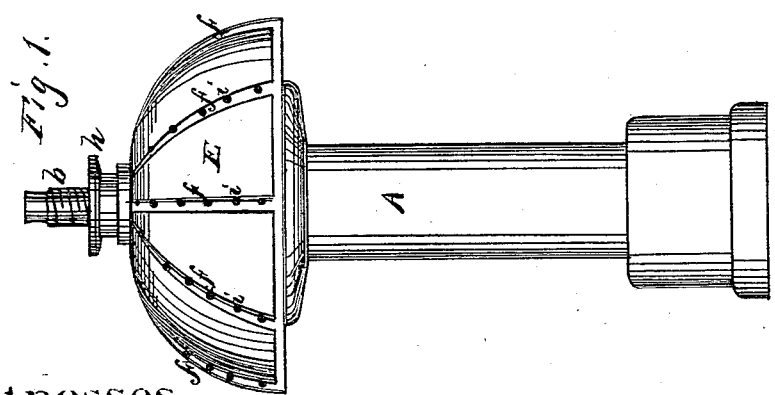
Witnesses
Jno. L. Boone
Chs. H. Richardson
Nathaniel D. Clark
per Dewey & Co.
Atty s

UNITED STATES PATENT OFFICE.

NATHANIEL D. CLARK, OF SAN FRANCISCO, CALIFORNIA.

IMPROVEMENT IN GARDEN-SPRINKLERS.

Specification forming part of Letters Patent No. 148,596, dated March 17, 1874; application filed June 11, 1873.

*To all whom it may concern:*

Be it known that I, NATHANIEL D. CLARK, of San Francisco city and county, State of California, have invented an Improved Garden-Sprinkler; and I do hereby declare the following description and accompanying drawings are sufficient to enable any person skilled in the art or science to which it most nearly appertains to make and use my said invention or improvement without further invention or experiment.

My invention relates to an improved rotary garden or lawn sprinkler; and it consists in securing loosely upon a hollow spindle or nozzle a vessel having a plane and a convex side, and in so forming and perforating the convex side of said vessel that, when water is admitted into it, the action of the water, as it issues from the perforations, will cause it to rotate upon the spindle, and thus provide an ornamental fountain-sprinkler, which will convert the water into a fine spray, and distribute it evenly over a certain radius of ground.

In order to more fully illustrate and explain my invention, reference is had to the accompanying drawing, forming a part of this specification, in which—

Figure 1 is a side elevation of my sprinkler. Fig. 2 is a plan. Fig. 3 is a sectional elevation.

Let A represent a nozzle or hollow spindle, which can be secured tightly upon the end of a water-pipe in the manner of connecting an ordinary hose-nozzle. The upper end of this nozzle or pipe is closed, and a small screw-spindle, $b$, projects upward from it, as shown. Directly below the closed end of the spindle I make one or more holes, $c\ c$, at different points around the pipe, which communicate with the hollow interior, and a short distance below these holes a flange, $d$, is formed entirely around the pipe, the upper face of which is a plane. E is a hollow vessel, which is formed of a plane and a convex side, the two forming a semi-globular vessel. The convex side has a number of radial ridges, $f\ f$, formed in it at intervals by pressing or otherwise indenting the metal outward at the point where ridges occur, thus forming grooves on the inner or reverse side of the plate. Along one side of each of these ridges I make perforations $i\ i$, in the manner of perforating an ordinary sprinkler. A hole is made in the center of the plane side of the vessel large enough to allow it to slip down over the upper end of the spindle or nozzle A, and rest upon the upper plane surface of the flange $d$. In order to permit this a hole is also made through the center of the convex side large enough to permit the screw-post $b$ to pass up through it. The vessel is then secured upon the nozzle by a nut, $h$, which turns down upon the screw $b$.

When thus arranged, the holes $c\ c$ in the upper end of the pipe or nozzle A will communicate with the interior of the vessel E, and will deliver the water into it. The water will then be forced out through the perforations by the internal pressure, and, as the perforations are all made on the same side of each ridge, the tendency of the water to pass out in a straight line will cause the vessel E to rotate automatically.

A sprinkler of small size, made in the manner above described, can be attached to an ordinary hose-nozzle, so as to be used as a hand-sprinkler, if desired.

By this arrangement I provide a rotary lawn-sprinkler, which will, by its rotation, divide the water into a fine spray or mist, and scatter it uniformly over a large radius of ground.

By making the stand upon which the sprinkler revolves portable, it can be moved from place to place, and thus be used at any point desired.

Having thus described my invention, what I claim, and desire to secure by Letters Patent, is—

A garden-sprinkler, constructed as shown and described.

In witness whereof I have hereunto set my hand and seal.

NATHANIEL D. CLARK. [L. S.]

Witnesses:
R. E. WILHOIT,
T. K. HOOK.